United States Patent
Mitsuhashi et al.

(10) Patent No.: US 8,081,708 B2
(45) Date of Patent: Dec. 20, 2011

(54) RERADIATION APPARATUS FOR TERRESTRIAL DIGITAL BROADCASTING AND METHOD FOR RERADIATING TERRESTRIAL DIGITAL BROADCASTING

(75) Inventors: Masaru Mitsuhashi, Tokyo (JP); Hideki Ono, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 575 days.

(21) Appl. No.: 12/258,655

(22) Filed: Oct. 27, 2008

(65) Prior Publication Data

US 2009/0122843 A1 May 14, 2009

(30) Foreign Application Priority Data

Nov. 14, 2007 (JP) ................................ 2007-295823

(51) Int. Cl.
H04L 27/00 (2006.01)
(52) U.S. Cl. ...................................................... 375/295
(58) Field of Classification Search .................. 375/295, 375/297, 211; 455/114.3
See application file for complete search history.

(56) References Cited

U.S. PATENT DOCUMENTS 6,738,641 B1 * 5/2004 Elsasser ........................ 455/523

FOREIGN PATENT DOCUMENTS

JP 2004-56697 2/2004

OTHER PUBLICATIONS

Office Action issued Feb. 24, 2011 in Canada Application No. 2,643,204.

* cited by examiner

Primary Examiner — Sam K Ahn
(74) Attorney, Agent, or Firm — Oblon, Spivak, McClelland, Maier & Neustadt, L.L.P.

(57) ABSTRACT

A reradiation apparatus for terrestrial digital broadcasting includes plural antennas provided on a train and mutually spaced along the running direction of the train, plural receiving processing parts provided corresponding to the antennas, a master selecting part which sets the receiving processing part corresponding to the antenna provided at the rear of the train as a master receiving processing part, a monitoring part which monitors a received state of the terrestrial digital broadcasting signal received by the master receiving processing part and outputs a supervisory signal, a switching part, and a reradiation unit. The switching part chooses the terrestrial digital broadcasting signal received by the master receiving processing part or the terrestrial digital broadcasting signal received by another receiving processing part based on the supervisory signal output by the monitoring part. The reradiation unit reradiates the chosen terrestrial digital broadcasting signal in the train.

4 Claims, 8 Drawing Sheets

RERADIATION APPARATUS FOR TERRESTRIAL DIGITAL BROADCASTING AND METHOD FOR RERADIATING TERRESTRIAL DIGITAL BROADCASTING

CROSS REFERENCE TO RELATED APPLICATION

This application is based upon and claims the benefit of priority from the Japanese Patent Application No. 2007-295823, filed on Nov. 14, 2007, the entire contents of which are incorporated here in by reference.

FIELD OF THE INVENTION

The present invention relates to a reradiation apparatus for terrestrial digital broadcasting which is carried in mobiles, such as an electric train and reradiates a terrestrial digital broadcasting signal in the mobile, and relates to a method for reradiating it.

DESCRIPTION OF THE BACKGROUND

Needs to view and listen to terrestrial digital broadcasting always anywhere are growing with the spread of terrestrial digital broadcasting. For example, the needs are expanded dramatically by having carried the viewing function of the partial reception layer (one-segment broadcasting) of terrestrial digital broadcasting (ISDB-T System) adopted in the countries including Japan in the mobile telephone. Under such a situation, it is proposed that only the one-segment of terrestrial digital broadcasting is extracted and it is reradiated in an underground shopping area or a building where terrestrial digital broadcasting can not be received (see JP2005-341195A). A system which receives terrestrial digital broadcasting during running and reradiates it in cars in a rail train is also proposed (see JP2002-111609A).

However, when reradiating terrestrial digital broadcasting within the mobiles such as a rail train etc., broadcast wave is screened by a building etc. with movement of the mobile, and a reception status gets worse intermittently. Therefore, there is a problem that reception is un-continuable.

SUMMARY OF THE INVENTION

The above-mentioned situation is taken into consideration, and an object of the present invention is to provide a reradiation apparatus for terrestrial digital broadcasting which can continue to reradiates the broadcasting signal even if the reception status of the broadcasting signal deteriorates intermittently with movement, and a method for reradiating it.

A reradiation apparatus for terrestrial digital broadcasting according the embodiment of the present invention includes plural antennas for receiving the terrestrial digital broadcasting signal, the antennas being formed along the running direction on the mobile and spaced mutually; plural receiving processing parts for receiving the terrestrial digital broadcasting signal received by the antennas, the receiving processing parts being provided corresponding to the antennas; a master selecting part for choosing one of the receiving processing parts as a master; a monitoring part for monitoring the receive states of the terrestrial digital broadcasting signals of the plural receiving processing parts, and outputting a supervisory signal showing receivable or unreceivable; a switch part for choosing the terrestrial digital broadcasting signal received by the receiving processing part selected as the master when said supervisory signal for the receiving processing part chosen as the master is receivable, and for choosing the terrestrial digital broadcasting signal received by said other receiving processing parts when the supervisory signal for the receiving processing part chosen as the master is unreceivable; and a reradiation unit for reradiating the terrestrial digital broadcasting signal chosen by the switch part in the mobile.

DETAILED DESCRIPTION OF THE INVENTION

Hereafter, the reradiation apparatus for terrestrial digital broadcasting according to the embodiment is explained in detail with reference to drawings.

FIG. 1 through FIG. 4 are the conceptual drawings showing the environment of the train carrying the reradiation apparatus for the terrestrial digital broadcasting concerning the embodiment. The terrestrial digital broadcasting signal (hereafter, simply called as "broadcasting signal") which has a layered structure of 13 segments including a base segment (called one-segment) is broadcasted on specific channel frequency (hereinafter, called a-Channel) from broadcasting station (or transmitting station) A. Train 1 of three-car formation, which comprises rear car 1-1, middle car 1-2 and head car 1-3, runs in a broadcast area in a direction of arrow F. Train 1 runs in order of FIGS. 1, 2, 3 and 4. Under the environment where the broadcast wave shield B, such as a building or a hill, exists near rails C, the terrestrial digital broadcasting is reradiated in train 1. The reradiation apparatus for the terrestrial digital broadcasting is divided and arranged in each car 1-1, 1-2 and 1-3. Here, both rear car 1-1 and head car 1-3 are equipped with a reception function, and an reception output of rear car is given priority and used.

Figure 5:
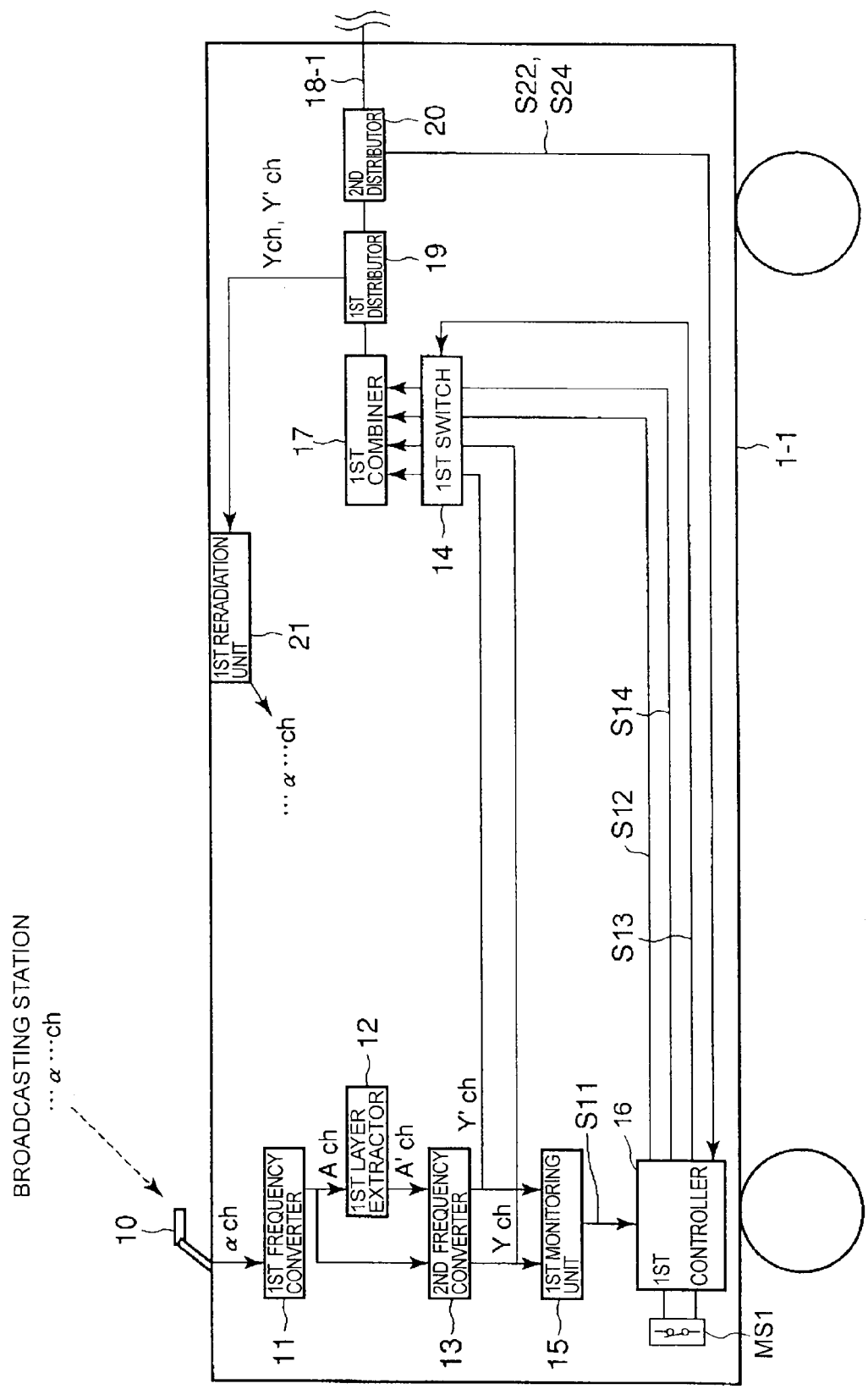
FIG. 5 is a block diagram showing a structure of the reradiation apparatus for the terrestrial digital broadcasting installed in a rear car.
Figure 6:
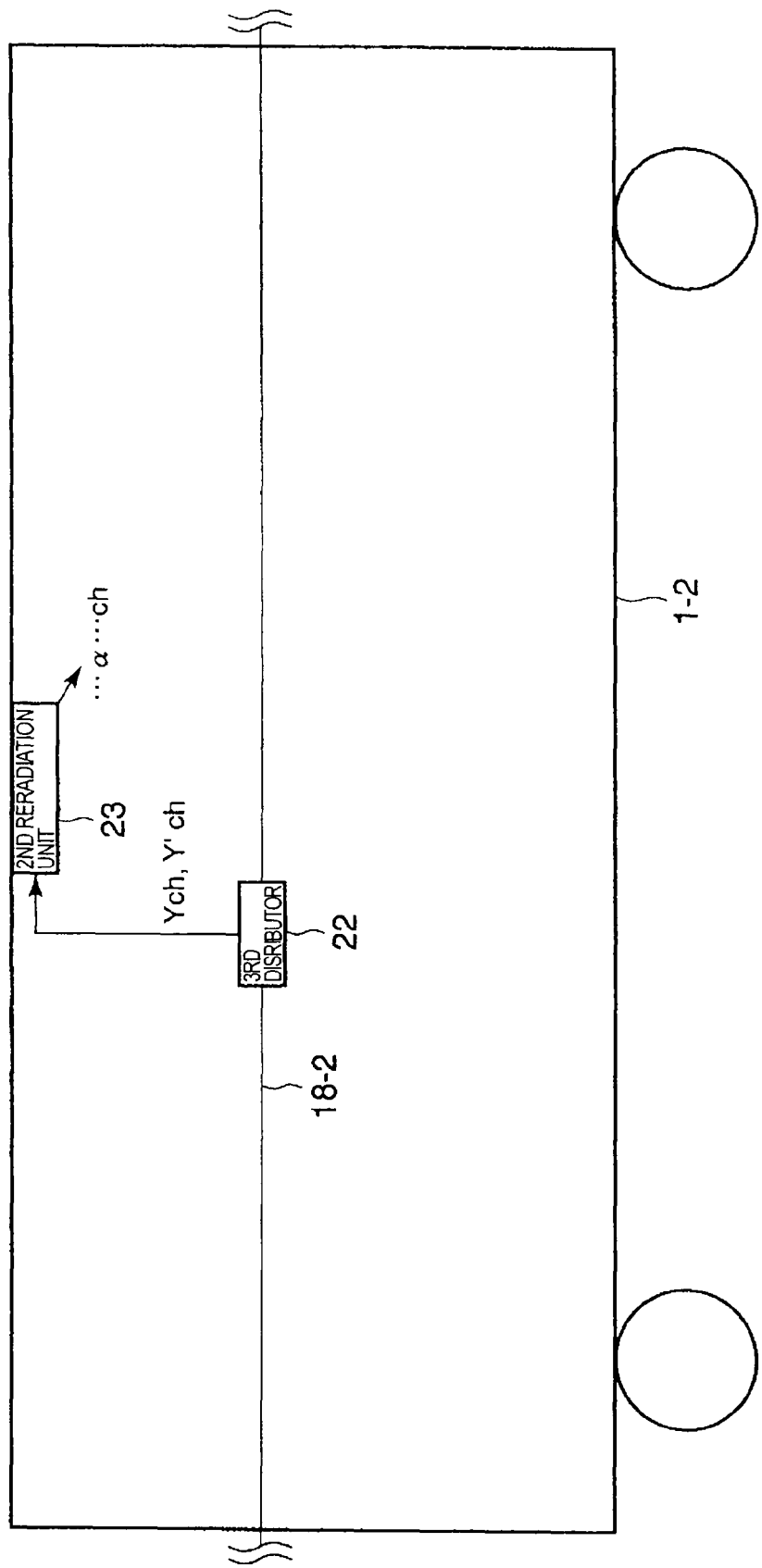
FIG. 6 is a block diagram showing a structure of the reradiation apparatus for the terrestrial digital broadcasting installed in a middle car.
Figure 7:
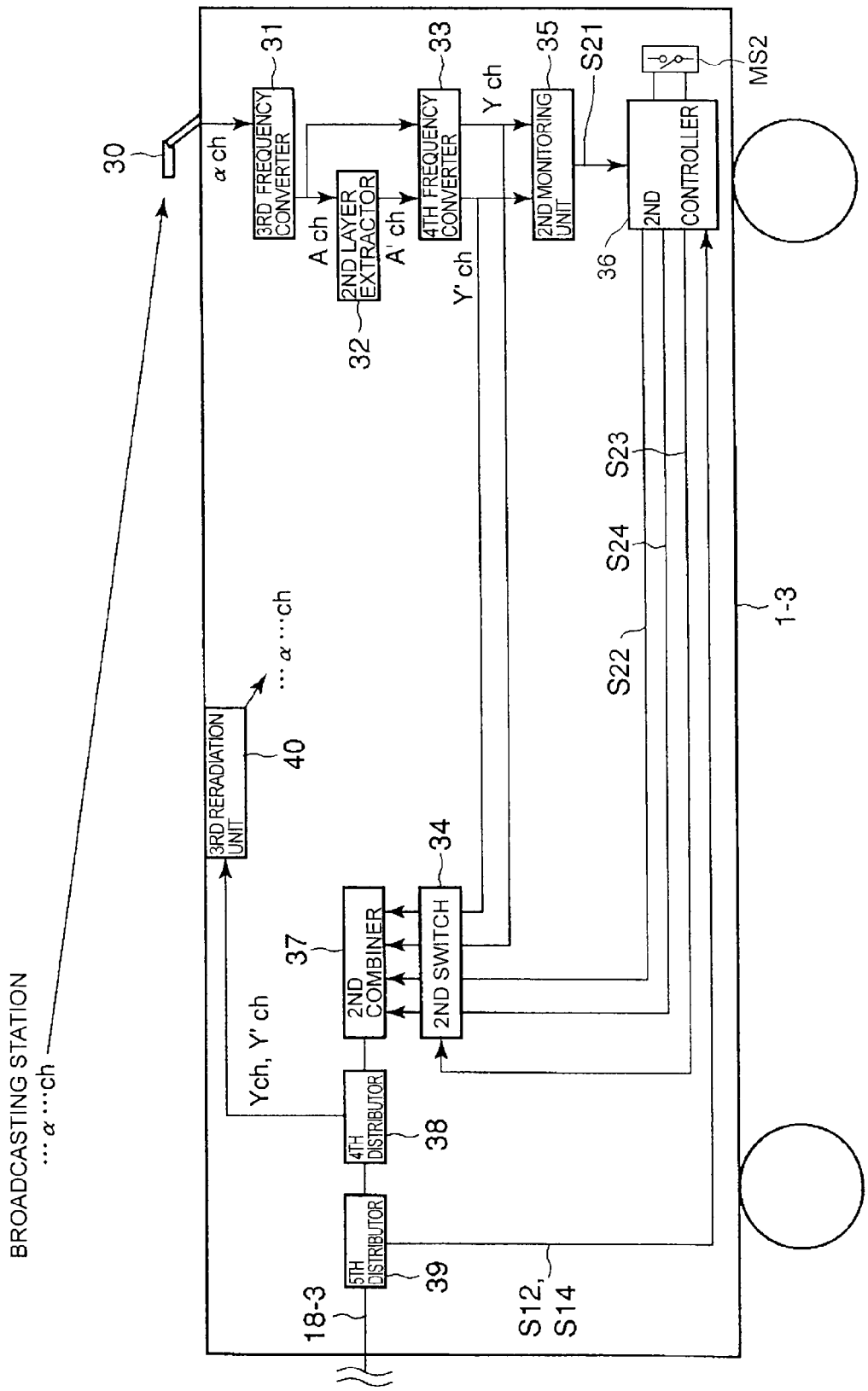
FIG. 7 is a block diagram showing a structure of the reradiation apparatus for the terrestrial digital broadcasting installed in a head car.
Figure 8:
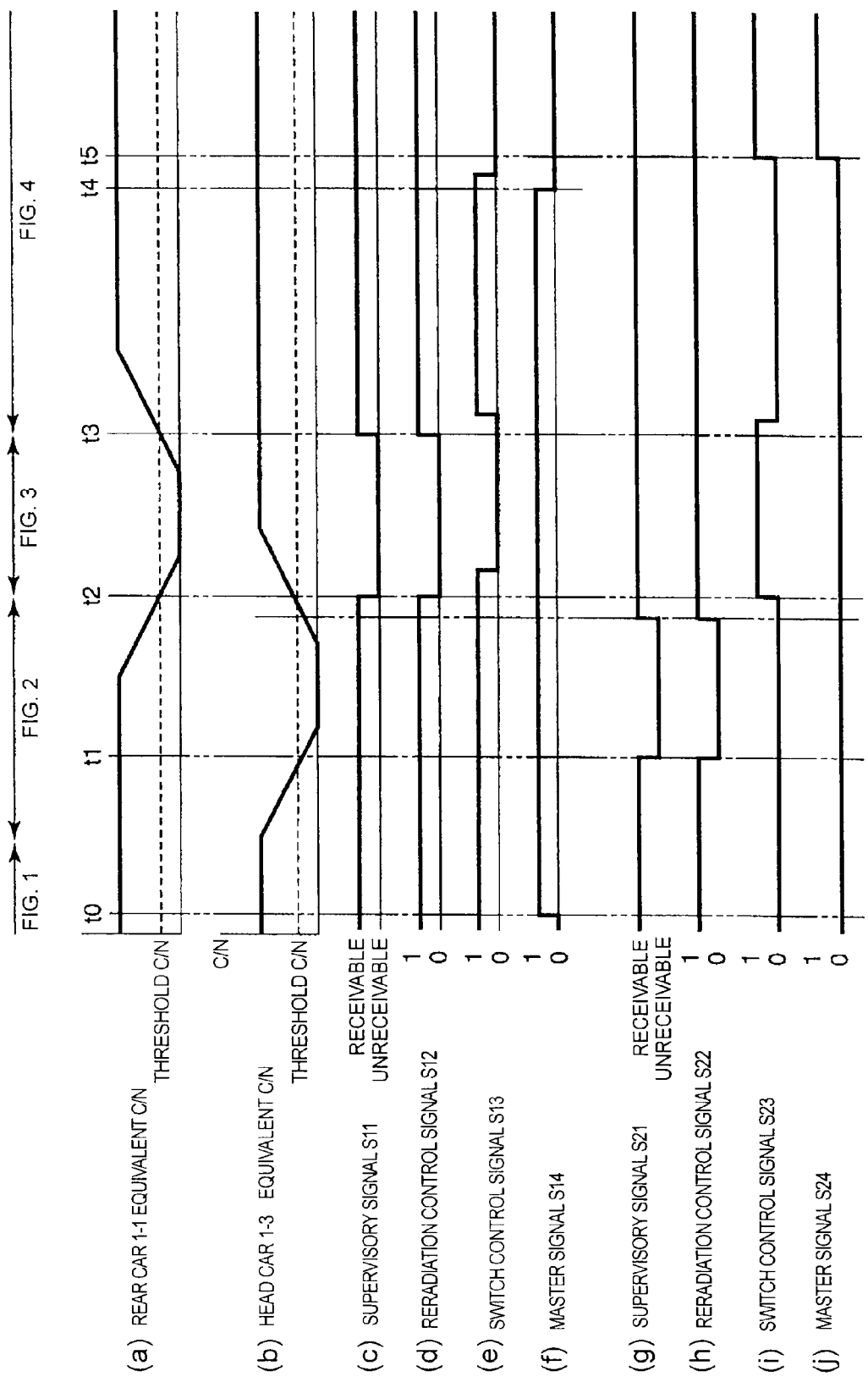
FIG. 8 is a timing chart showing an output timing waveform of each processing part of the reradiation apparatus for the terrestrial digital broadcasting concerning the embodiment.

FIG. 5 through FIG. 7 are block diagrams showing a structure of the reradiation apparatus for the terrestrial digital broadcasting (hereinafter, a "reradiation part") which are divided and arranged into car 1-1, 1-2 and 1-3, respectively.

FIG. 5 shows the structure of the reradiation part installed in rear car 1-1. Receiving antenna 10 is installed in a rear of a roof of rear car 1-1. A terrestrial digital broadcasting wave a-Channel from broadcast station A received with receiving antenna 10 is inputted into 1st frequency converter 11. This 1st frequency converter 11 tunes in terrestrial digital broadcasting wave a-Channel from received signals and converts it to predetermined channel frequency (hereafter, it is described as A-Channel). The broadcasting signal of 13 segments which was converted to A-Channel is inputted into 1st layer extraction unit 12, and only base segment (hereafter described as "one-segment") portion A'-Channel is extracted here. Both these channel signals A-Channel and A'-Channel are inputted into 2nd frequency converter 13, and are converted into frequencies Y-Channel and Y'-Channel, respectively. Broadcasting signals Y-Channel and Y'-Channel are sent to 1st switch 14, and are sent also to 1st monitoring unit 15. In addition, 1st frequency converter 11, 1st layer extraction unit 12, and 2nd frequency converter 13 constitute a 1st receiving processing part.

This 1st monitoring unit 15 performs signal monitoring of the whole 13 segments (Y-Channel), and signal monitoring of the one-segment portion (Y'-Channel) about broadcasting signals Y-Channel and Y'-Channel which are inputted. That is, when equivalent C/Ns of the 13 segments received signal and the one-segment received signal of the broadcasting signal are less than respective receivable threshold C/Ns (for example, if it is QPSK, or convolutional code rate of ⅔, it is 7 dB), even if the receiver terminal receives a reradiation signal, the receiver terminal cannot demodulate it. Then, 1st monitoring unit 15 monitors equivalent C/Ns about 13 segments received signal Y-Channel and one-segment received signal Y'-Channel, and outputs supervisory signal S11. That is, 1st monitoring unit 15 outputs supervisory signal S11 which shows receivable to 1st control device 16 when either one of broadcasting signal Y-Channel or broadcasting signal Y'-Channel exceeds the threshold C/Ns, and outputs supervisory signal S11 which shows unreceivable when both broadcasting signals Y-Channel and Y'-Channel are less than the threshold C/Ns. 1st monitoring unit 15 constitutes the monitoring part with 2nd monitoring unit 35 installed in the head car mentioned later.

If 1st control unit 16 receives supervisory signal S11 which shows receivable/unreceivable from 1st monitoring unit 15, 1st control device 16 generates reradiation control signal S12 for stopping sending out of the received signal by the head car side when supervisory signal S11 becomes receivable, and then 1st control device 16 generates switch control signal S13 which makes 1st switch 14 ON state. After 1st control unit 16 stops generating of reradiation control signal S12 when supervisory signal S11 becomes unreceivable, 1st control unit 16 generates switch control signal S13 which changes 1st switch 14 into an OFF state and outputs it to 1st switch 14. This 1st control device 16 is connected with master selection switch MS1 arranged, for example in a conductor's compartment. Master selection switch MS1 constitutes master selecting part M with master selection switch MS2 installed in the head car mentioned later. When a crew of rear car 1-1, for example, a conductor does ON operation of this switch MS1, the reradiation part of rear car 1-1 is set up as a master. That is, by ON operation of switch MS1, 1st control device 16 is set up as master, and 1st receiving processing part is also set up as a master because 1st control device 16 is set up as master. Therefore, the 1st receiving processing part is chosen as master by switch MS1. 1st control device 16 generates master signal S14 which shows that the rear car is master, and outputs it to 1st switch 14. In addition, 1st switch 14 and 2nd switch 34 mentioned later constitute a switching part.

When the reradiation part of car 1-1 is set up as a master and supervisory signal S11 shows receivable, 1st control device 16 sets 1st switch 14 ON state with switch control signal S13, and outputs broadcasting signals Y-Channel and Y'-Channel, reradiation control signal S12 and master signal S14 to 1st combiner 17. When supervisory signal S11 shows unreceivable, 1st control device 16 stops generating of reradiation control signal S12 and notifies an unreceivable state to the reradiation part of the head car. And then 1st switch 14 is changed to OFF state with switch control signal S13, and output of broadcasting signals Y-Channel, Y'-Channel and master signal S14 is blocked. When supervisory signal S11 returns receivable, 1st control device 16 generates reradiation control signal S12, and then 1st control device 16 returns 1st switch 14 to ON state with switch control signal S13 and making broadcasting signals Y-Channel, Y'-Channel, reradiation control signal S12 and master signal S14 output to 1st combiner 17.

1st combiner 17 combines broadcasting signals Y-Channel, Y'-Channel, reradiation control signal S12 and master signal S14 outputted from 1st switch 14 multiplex to transfer cable 18-1 which connects between each car. In rear car 1-1, 1st and 2nd distributors 19 and 20 are provided in a middle of transfer cable 18-1. 1st distributor 19 distributes broadcasting signals Y-Channel and Y'-Channel which is transferred to transfer cable 18-1 or broadcasting signals Y-Channel, Y'-Channel combined multiplex in head car 1-3 side mentioned below and sends them out to 1st reradiation unit 21. This 1st reradiation unit 21 converts at least one of broadcasting signals Y-Channel and Y'-Channel to reradiation frequency a-Channel and reradiates it in car 1-1. 2nd distributor 20 distributes below-mentioned reradiation control signal S22 and master signal S24 combined multiplex in head car 1-3 and sends them out to 1st control device 16. 1st control device 16 grasps a receive state of the reradiation part of the head car from existence of reradiation control signal S22, and recognizes that the reradiation part of vehicle 1-3 is master from master signal S24. In addition, 1st control device 16 generates switch control signal S13 which makes turn off 1st switch 14 by master signal S24.

FIG. 6 shows the structure of the reradiation part installed in middle car 1-2. In middle car 1-2, transfer cable 18-2 which is connected to rear car 1-1 and head car 1-3 respectively is provided, and 3rd distributor 22 is provided in transfer cable 18-2. Distributor 22 distributes broadcasting signals Y-Channel and Y'-Channel which are transferred from rear car 1-1 or head car 1-3 from transfer cable 18-2, and sends them to 2nd reradiation unit 23. 2nd reradiation unit 23 chooses at least one of broadcasting signals Y-Channel and Y'-Channel, converts it to reradiation frequency a-Channel, and reradiates it in car 1-2.

FIG. 7 shows the structure of the reradiation part installed in head car 1-3. Receiving antenna 30 is installed in a front part of a roof of head car 1-3. Terrestrial digital broadcasting wave a-Channel from broadcasting station A received with receiving antenna 30 is inputted into 3rd frequency converter 31. 3rd frequency converter 31 tunes in the terrestrial digital broadcasting wave a-Channel from the received signals and converts it the predetermined channel frequency A-Channel. The broadcasting signal of 13 segments which was converted to A-Channel is inputted into 2nd layer extraction unit 32, and only one-segment portion A'-Channel is extracted here. Both these channel signals A-Channel and A'-Channel are inputted into 4th frequency converter 33, and are converted into frequencies Y-Channel and Y'-Channel, respectively. Broadcasting signals Y-Channel and Y'-Channel are sent to 2nd switch 34, and are sent also to 2nd monitoring unit 35. In addition, 3rd frequency converter 31, 2nd layer extraction unit 32, and 4th frequency converter 33 constitute a 2nd receiving processing part.

2nd monitoring unit 35 monitors each equivalent C/N about the whole 13 segments (Y-Channel) and the one-segment portion (Y'ch) of the broadcasting signal which were inputted, and outputs supervisory signal S21. That is, 2nd monitoring unit 35 outputs supervisory signal S21 which shows receivable to 2nd control device 36 when either one of broadcasting signals Y-Channel and Y'-Channel exceeds threshold C/Ns, and outputs supervisory signal S21 which shows unreceivable to 2nd control device 36 when both broadcasting signals Y-Channel and Y'-Channel are less than threshold C/Ns.

When 2nd control device 36 receives supervisory signal S21 which shows receivable/unreceivable from 2nd monitoring unit 35, 2nd control device 36 generates reradiation control signal S22 for stopping sending out of the received signal by the rear car side when supervisory signal S21 becomes receivable, and then 2nd control device 36 generates switch control signal S23 which makes 2nd switch 34 ON state. After 2nd control unit 36 stops generating of reradiation control signal S22 when supervisory signal S21 becomes unreceivable, 2nd control unit 36 generates switch control signal S23 which changes 2nd switch 34 into OFF state and outputs it to 2nd switch 14. 2nd control device 36 is connected with master selection switch MS2 arranged, for example in a cab. When the running direction of the train is reversed and car 1-3 turns into a rear car, the conductor does ON operation of switch MS2, and thereby the reradiation part of car 1-3 is set up as master. That is, by ON operation of switch MS2, 2nd control device 36 is set up as master, and the 2nd receiving processing part is also set up as master because 2nd control device 36 is set up as master. Therefore, the 2nd receiving processing part is chosen as master by switch MS2. 2nd control device 36 generates master signal S24 which shows that car 1-3 is master, and outputs it to 2nd switch 34.

When the reradiation part of car 1-3 is set up as master and supervisory signal S21 shows receivable, 2nd control device 36 sets 2nd switch 34 as ON state with switch control signal S23, and outputs broadcasting signals Y-Channel and Y'-Channel, reradiation control signal S22 and master signal S24 to 2nd combiner 37. When supervisory signal S21 shows unreceivable, after 2nd control device 36 stops generating of reradiation control signal S22 and notifies an unreceivable state to the rear car side, 2nd control device 36 changes 2nd switch 34 to OFF state with switch control signal S23, and the output of broadcasting signals Y-Channel, Y'-Channel, and master signal S24 is blocked. When supervisory signal S21 returns receivable, 2nd control device 36 generates reradiation control signal S22, and then 2nd control device 36 returns 2nd switch 34 to ON state with switch control signal S23, and makes broadcasting signals Y-Channel, Y'-Channel, reradiation control signal S22 and master signal S24 output to 2nd combiner 37.

2nd combiner 37 combines broadcasting signals Y-Channel, Y'-Channel, reradiation control signal S22 and master signal S24 outputted from 2nd switch 34 multiplex to transfer cable 18-3. In head car 1-3, 4th and 5th distributors 38 and 39 are provided in a middle of transfer cable 18-3. 4th distributor 38 distributes broadcasting signals Y-Channel and Y'-Channel which are combined multiplex to transfer cable 18-3 in rear car 1-1 and broadcasting signals Y-Channel and Y'-Channel which are combined multiplex in head car 1-3, and sends them out to 3rd reradiation unit 21. This 3rd reradiation unit 40 converts at least one of broadcasting signals Y-Channel and Y'-Channel to reradiation frequency a-Channel, and reradiates it in car 1-3. 5th distributor 39 distributes reradiation control signal S12 and master signal S14 combined multiplex in rear car 1-1 from transfer cable 18-3 and sends them out to 2nd control device 36. 2nd control device 36 grasps the receive state of the reradiation part of the rear car from the existence of reradiation control signal S12, and recognizes that the reradiation part of present rear car 1-1 serves as master from master signal S14. 2nd control device 36 generates switch control signal S23 which makes turn off 2nd switch 36 by master signal S14.

Here, transfer cables 18-1 to 18-3 are laid straddling between each car in present rail cars, and the information and telecommunications between the cars are bi-directionally possible. In this embodiment, using this transfer cables 18-1 to 18-3, the received broadcasting signal is distributed to reradiation unit 21, 23 and 40 which are arranged in each car 1-1 to 1-3 and reradiation unit 21, 23 and 40 reradiate broadcasting signal in each car. The reradiation part of rear car 1-1 is set as master, 1st control device 16 generates a master signal S14 and transmits it to 2nd control device 36 of head car 1-3 to make 2nd control device 36 function as slave. For this reason, even if master selection switch MS2 of the head car becomes ON accidentally, it is avoidable that the reradiation part of the head car becomes a master state.

In the above-mentioned structure, a processing operation of the reradiation apparatus for the terrestrial digital broadcasting of this embodiment is explained with reference to FIG. 1 through FIG. 4 and FIG. 8 which shows output timing wave form chart of each part. In addition, in FIG. 8, (a) shows equivalent C/N in rear car 1-1, (b) shows equivalent C/N in head car 1-3, (c) shows supervisory signal S11, (d) shows reradiation control signal S12, (e) shows supervisory signal S21, (f) shows master signal S14, (g) shows supervisory signal S21, (h) shows reradiation control signal S22, (i) shows switch control signal S23 and (j) shows master signal S24.

Now, the time for the train to leave a starting station is set to t0. At t0, the reradiation part of rear car 1-1 is in a master state, and the received signals of terrestrial digital broadcasting wave a-Channel and one-segment broadcasting in rear car 1-1 and head car 1-3 are assumed to be in the state of exceeding the threshold C/Ns. At this time, master signal S14 is generated from 1st control device 16 by ON operation of master selection switch MS1 of rear car 1-1. Supervisory signal S11 has become receivable, and reradiation control signal S12 is generated. Thereby, switch control signal S13 of ON instructions is generated, and broadcasting signals Y-Channel, Y'-Channel, reradiation control signal S12 and master signal S14 are supplied to 1st combiner 17 from 1st switch 14, and combined multiplex to transfer cables 18-1 to 18-3. Thereby, broadcasting signals Y-Channel and Y'-Channel are distributed to reradiation unit 21, 23 and 40 via transfer cables 18-1 to 18-3, and are reradiated in each car by reradiation unit 21, 23 and 40.

Figure 1:
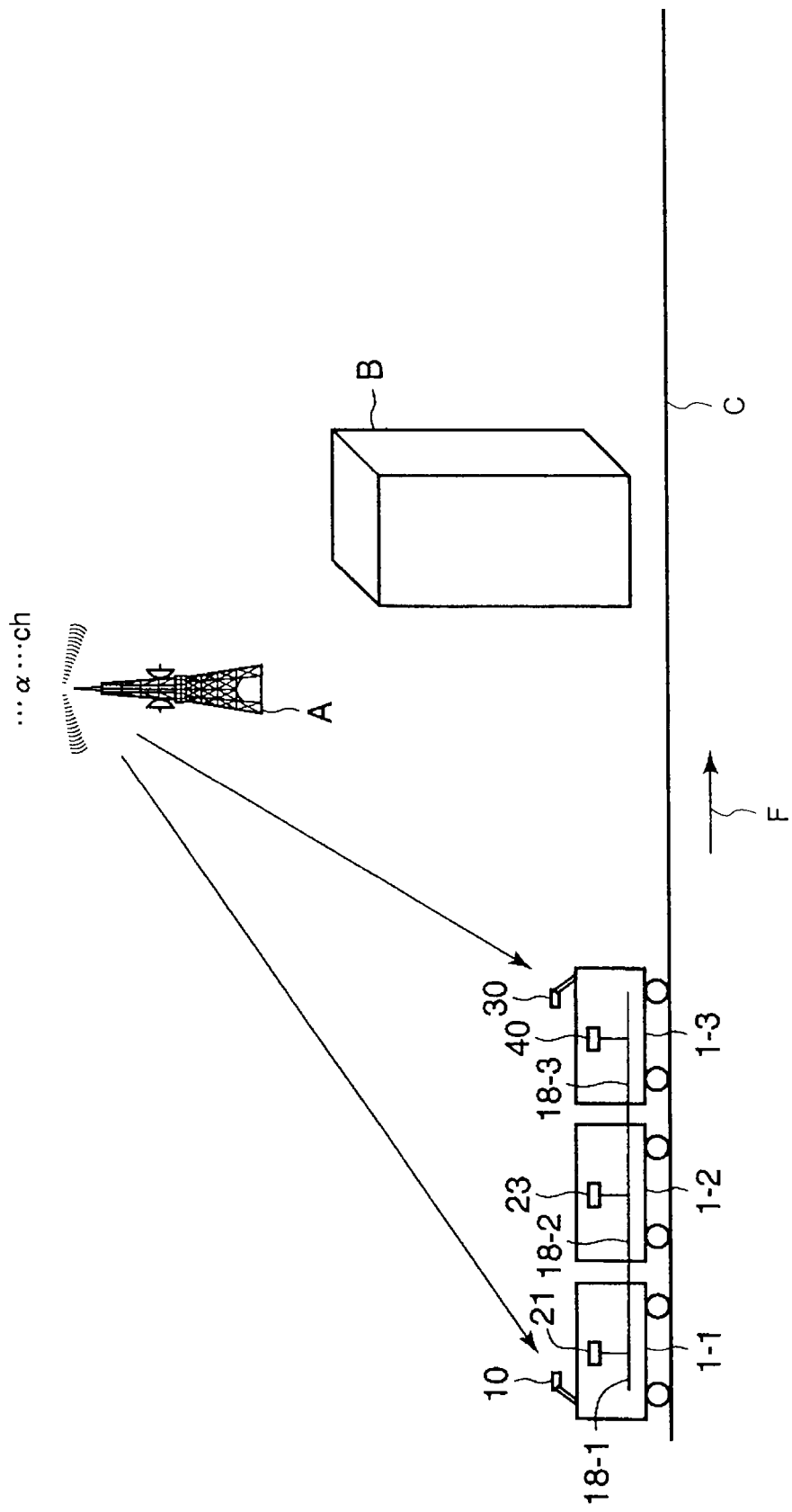
FIG. 1 is a conceptual drawing showing one example of an environment of a train carrying a reradiation apparatus for terrestrial digital broadcasting concerning an embodiment.

The processing operation is maintained in the period while the train runs as shown in FIG. 1 with the above-mentioned environment. At this time, master signal S14 is sent to head car 1-3 via transfer cables 18-1 to 18-3, and is distributed and supplied to 2nd control device 36 by 5th distributor 39. 2nd control device 36 sets switch control signal S23 as OFF while master signal S14 is received, and thereby 2nd switch 34 is set as OFF state. Therefore, in head car 1-3, even if the received signals of terrestrial digital broadcasting wave a-Channel and one-segment broadcasting exceed the threshold C/Ns and supervisory signal S21 shows receivable, 2nd switch 34 is set to OFF by 2nd control device 36. For this reason, in 2nd switch 34, broadcasting signals Y-Channel, Y'-Channel and reradiation control signal S22 are blocked, and supply to transfer cable 18-3 is stopped.

Figure 2:
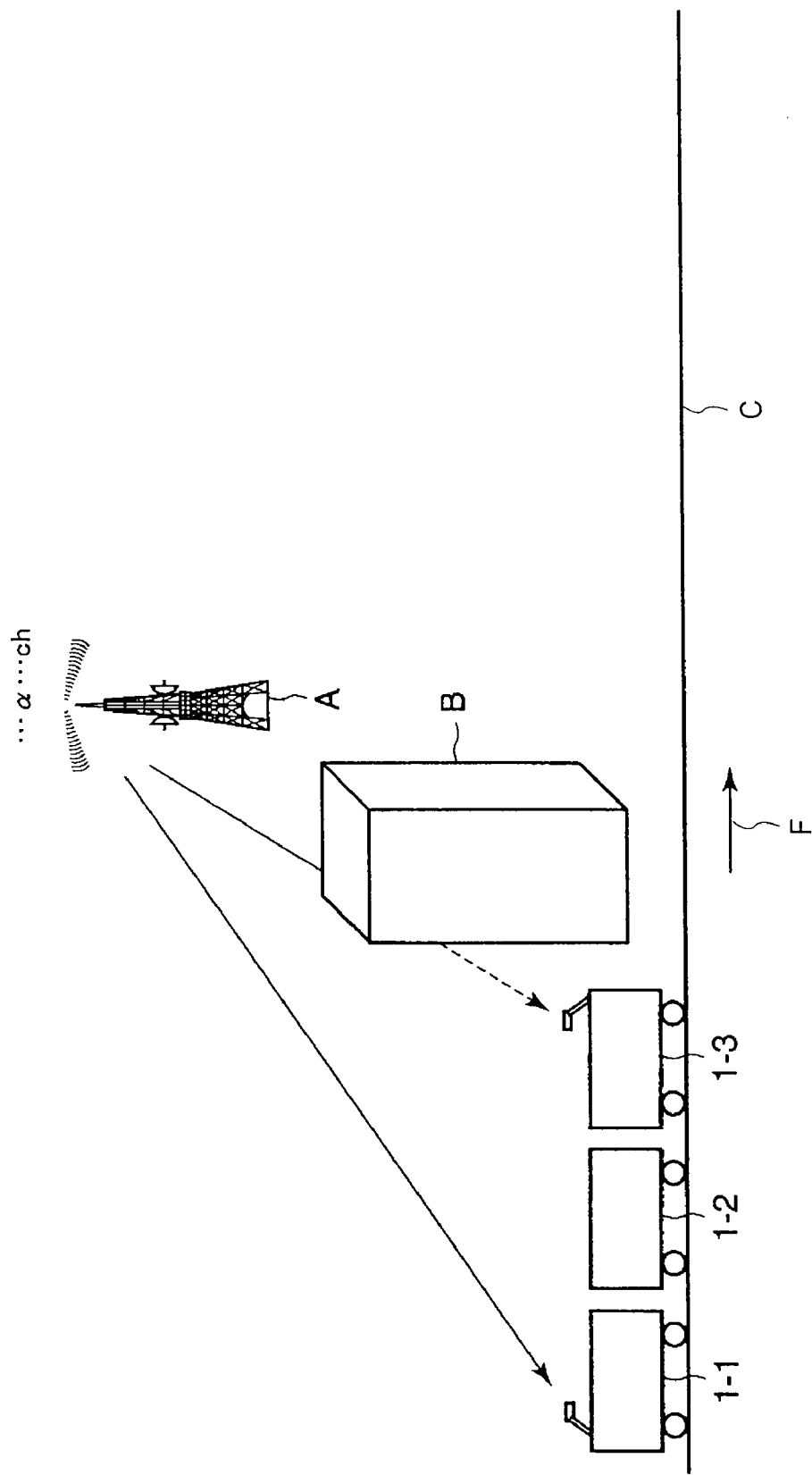
FIG. 2 is a conceptual drawing showing other example of the environment of the train carrying the reradiation apparatus for the terrestrial digital broadcasting concerning the embodiment.

Next, the train runs and in the case shown in FIG. 2, antenna 30 provided in head car 1-3 is covered with broadcast wave shield B. For this reason, the received signals of terrestrial digital broadcasting wave a-Channel and one-segment broadcasting become less than their threshold C/Ns (at time t1). However, in rear car 1-1 at this time, since the received signals of terrestrial digital broadcasting wave a-Channel and one-segment broadcasting exceed that their threshold C/Ns, in rear car 1-1, supervisory signal S11 which shows receivable is generated, and switch control signal S13 of ON instructions is outputted from 1st control device 16 and 1st switch 14 is made into ON state. Thereby, broadcasting signals Y-Channel and Y'-Channel are combined multiplex to transfer cables 18-1 to 18-3. Broadcasting signals Y-Channel and Y'-Channel are sent to reradiation unit 21, 23 and 40 of each car, and are reradiated in each car by reradiation frequency a-Channel.

Figure 3:
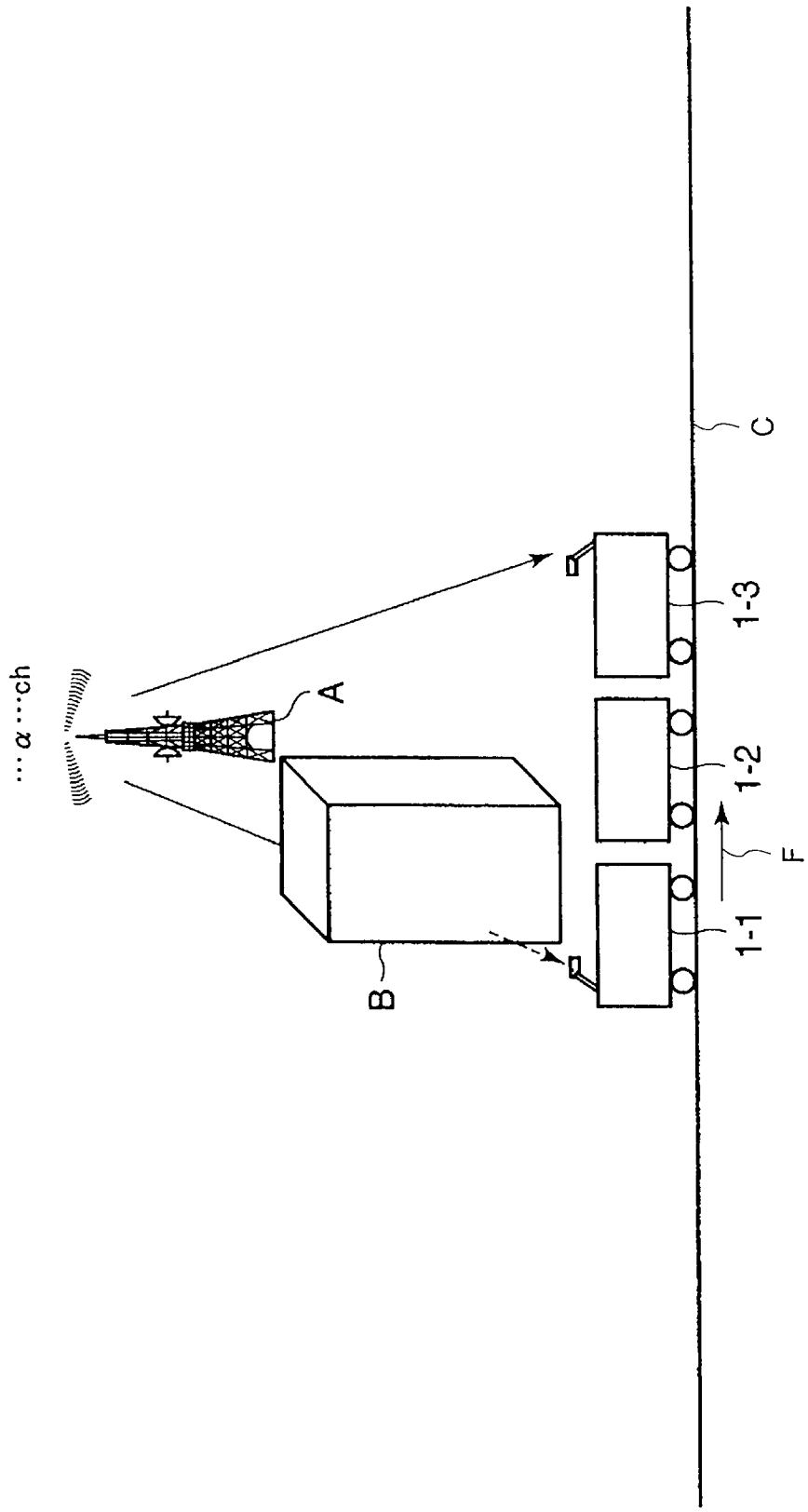
FIG. 3 is a conceptual drawing showing furthermore other example of the environment of the train carrying the reradiation apparatus for the terrestrial digital broadcasting concerning the embodiment.

Next, the train runs and in the case shown in FIG. 3, antenna 10 provided in rear car 1-1 is covered with broadcast wave shield B. For this reason, the received signals of terrestrial digital broadcasting wave a-Channel and one-segment broadcasting become less than their threshold C/Ns. On the other hand, since head car 1-3 has passed through the area affected by the influence of broadcast wave shield B, the received signals of terrestrial digital broadcasting wave a-Channel and one-segment broadcasting exceed their threshold C/Ns (time t2). At this time, in rear car 1-1, 1st monitoring unit 15 generates supervisory signal S11 which shows unreceivable. According to this, 1st control device 16 stops generating of reradiation control signal S12. Although switch control signal S13 is also changed to OFF instructions with confirmation of supervisory signal S11 being unreceivable, a switching timing is delayed in order to wait to stabilize reradiation control signal S12. It prevents from hunching of the change between the broadcasting signals of the receiving processing part is chosen as a master and the broadcasting signal of the receiving processing part not chosen as a master. When switch control signal S13 becomes OFF instructions, switch 14 becomes in OFF state and master signal S14 is also blocked.

According to this, 2nd control device 36 confirms stop of generating of reradiation control signal S12 via 1st switch 14, transfer cables 18-1 to 18-3 and 5th distributor 39 of head car 1-3. 2nd control device 36 of head car 1-3 generates switch control signal S23 of ON instructions and makes 2nd switch 34 turn on by a confirmation of stop of generating of reradiation control signal S12 and a block of master signal S14. Thereby, broadcasting signals Y-Channel and Y'-Channel from 4th frequency converter 33 are supplied to reradiation unit 40, 23 and 21 via transfer cables 18-3, 18-2 and 18-1 and distributors 38, 22 and 19, and are reradiated to each car.

Figure 4:
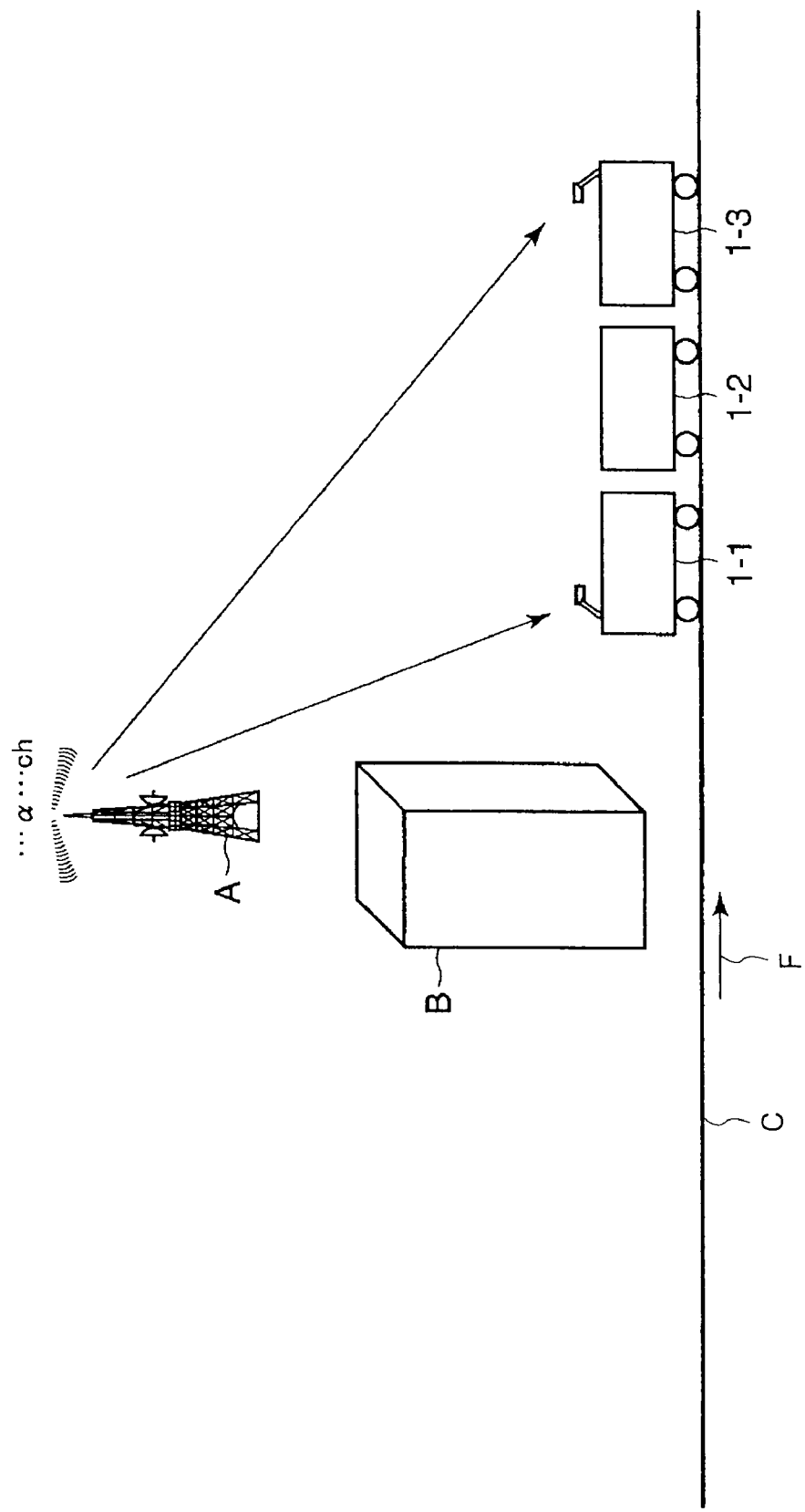
FIG. 4 is a conceptual drawing showing furthermore other example of the environment of the train carrying the reradiation apparatus for the terrestrial digital broadcasting concerning the embodiment.

And in a period shown in FIG. 4, rear car 1-1 passed through the area affected by the influence of broadcast wave shield B. For this reason, when the received signals of terrestrial digital broadcasting wave a-Channel and one-segment broadcasting exceed their threshold C/Ns (time t3), supervisory signal S11 which shows receivable is outputted from 1st monitoring unit 15 in rear car 1-1, and reradiation control signal S12 is generated according to this change of supervisory signal S11. Although switch control signal S13 is also changed corresponding to the change of supervisory signal S11, the switching is delayed like the time of the stop of switch control signal S13.

1st switch 14 is set to ON by the change of switch control signal S13, and reradiation control signal S12 and master signal S14 are supplied to 2nd control device 36 of head car 1-3 via transfer cables 18-1, 18-2, and 18-3. 2nd control device 36 detects this reradiation control signal S12, and changes switch control signal S23 to OFF instructions. Thereby, 2nd switch 34 becomes OFF and the supply of broadcasting signals Y-Channel and Y'-Channel from 4th frequency converter 33 to transfer cable 18-3 is stopped. At this time, in rear car 1-1, by ON setup of 1st switch 14, reradiation control signal S12 and broadcasting signals Y-Channel and Y'-Channel from 2nd frequency converter 13 are supplied to reradiation unit 21, 23 and 40 via transfer cables 18-1, 18-2 and 18-3 and distributors 19, 22 and 38, and broadcasting signals Y-Channel and Y'-Channel are reradiated to each car.

Such a state is continued until the train arrives at a destination station. And when the train turns up and departs from the destination station, old head car 1-3 turns into the rear car, and rear car 1-1 becomes the head car. In connection with this, the conductor of rear car 1-1 turns off master selection switch MS1 of rear car 1-1, and makes control device 16 generate switch control signal S13 of OFF instructions, and makes 1st switch 14 turn off (time t4).

When master selection switch MS2 is turned on by the conductor in car 1-3 which becomes the rear car from the head car (time t5), switch control signal S23 of ON instructions is generated from 2nd control device 36, and 2nd switch 34 is made into ON state. Thereby, 2nd control device 36 is set as master and 1st control device 16 is set as slave, and operation contrary to above-mentioned operation is made.

Therefore, according to the reradiation apparatus for terrestrial digital broadcasting by the above-mentioned embodiment, paying attention to the length of the train and the running direction of the train, the reradiation apparatus usually reradiates the broadcasting signal received by the receiving processing part of the rear car, and only for the period when the threshold C/N is no longer acquired reradiates the broadcasting signal received by the receiving processing part of the head car. For this reason, even if it is under the environment where a receive state of the broadcast wave gets worse intermittently because one antenna is covered by the building etc. with movement of the train, the intermittence of the reradiation signal can be efficiently improved.

In addition, the present invention is not limited to the above-mentioned embodiment as it is, and in an practical stage, a component can be changed without departing from the scope of the invention. For example, although the above-mentioned explanation explained the case where the conductor operated the master selection switch in the rear car, in the case of a one-man operated train in which the conductor does not get on but only the driver gets on as the crew, it may be constituted so that the driver may operate the master selection switch in the head car. The master may not be set up but the slave may be set up. Furthermore, the antennas are not essential to be provided at the end car and the head car respectively, what is necessary is to provide the antennas mutually spaced along the running direction of the mobile.

Other embodiments or modifications of the present invention will be apparent to those skilled in the art from consideration of the specification and practice of the invention disclosed herein. It is intended that the specification and example embodiments be considered as exemplary only, with a true scope and spirit of the invention being indicated by the following.

What is claimed is:

1. A reradiation apparatus for terrestrial digital broadcasting which is carried in a train, receives a terrestrial digital broadcasting signal and reradiates the terrestrial digital broadcasting signal in the train, the reradiation apparatus for the terrestrial digital broadcasting comprising:

plural antennas for receiving the terrestrial digital broadcasting signal, the antennas being provided on the train and being spaced mutually along a running direction of the train, and one of the antennas being provided at a rear of the train;

plural receiving processing parts for receiving the terrestrial digital broadcasting signals received by the antennas, the receiving processing parts being provided corresponding to the antennas respectively;

a switch part for choosing one terrestrial digital broadcasting signal from the terrestrial digital broadcasting signals received by the plural receiving processing parts;

a master selecting part for setting the receiving processing part corresponding to the antenna provided at the rear of the train as a master receiving processing part and setting other receiving processing parts as slave receiving processing parts;

a monitoring part for monitoring the received state of the terrestrial digital broadcasting signal received by the receiving processing part set as the master receiving processing part, and outputting a supervisory signal showing whether the terrestrial digital broadcasting signal is receivable or unreceivable by the set master receiving processing part;

a controller for controlling the switch part so that the switch part chooses the terrestrial digital broadcasting signal received by the receiving processing part set as the master receiving processing part when the supervisory signal shows the terrestrial digital broadcasting signal is receivable by the set master receiving part, and so that the switch part chooses the terrestrial digital broadcasting signal received by the other receiving processing part when the supervisory signal shows the terrestrial digital broadcasting signal is unreceivable by the set master receiving processing part; and a reradiation unit for reradiating the terrestrial digital broadcasting signal chosen by the switch part in the train.

2. The reradiation apparatus for the terrestrial digital broadcasting according to claim 1, wherein a front of the train and the rear of the train are reversible according to the running direction of the train, and the master selecting part sets the receiving processing part corresponding to the antenna provided at the rear of the train according to the running direction of the train as the master receiving processing part.

3. The reradiation apparatus for the terrestrial digital broadcasting according to claim 1, wherein the train includes plural cars including a rear car and a head car, and the antennas are provided on the rear car and the head car, respectively.

4. The reradiation apparatus for the terrestrial digital broadcasting according to claim 1, wherein the terrestrial digital broadcasting signal comprises plural layers, and the reradiation unit reradiates all layers of the terrestrial digital broadcasting signal received by the receiving processing part or reradiates a specific layer extracted from the terrestrial digital broadcasting signal received the receiving processing part.

* * * * *